Feb. 9, 1960  A. STAMBERA  2,924,487
METHOD AND APPARATUS FOR CONVEYING BULK MATERIALS
Filed July 15, 1958
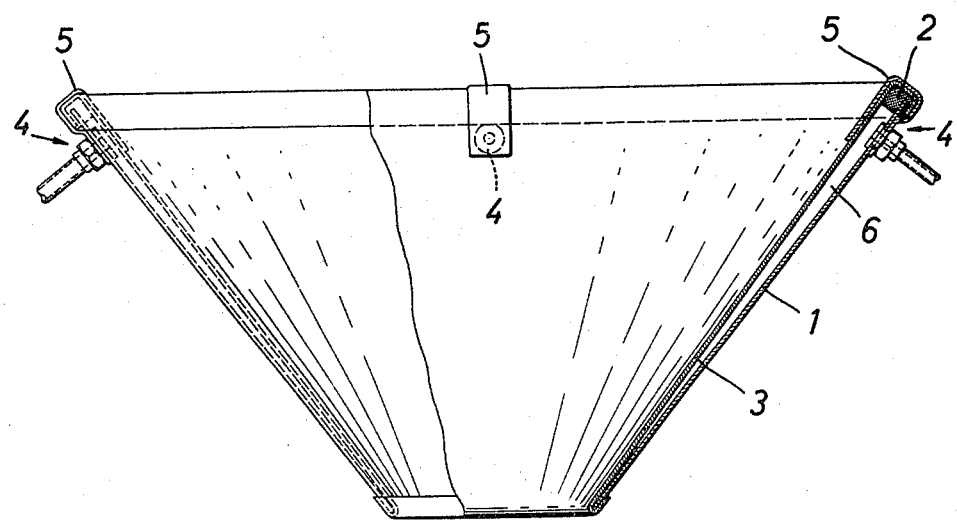

2,924,487

METHOD AND APPARATUS FOR CONVEYING BULK MATERIALS

Adolf Stambera, Stuttgart-Bad Cannstatt, Germany, assignor to Firma Fr. Hesser Maschinenfabrik-Aktiengesellschaft, Stuttgart-Bad Cannstatt, Germany, a corporation of Germany Application July 15, 1958, Serial No. 748,639

Claims priority, application Germany July 19, 1957

3 Claims. (Cl. 302—29)

This invention relates to bulk material conveyors and more specifically to a novel and improved method and apparatus for conveying bulk materials including flour, fodder and the like.

Bulk materials and particularly finely comminuted materials such as flour and the like are exceedingly difficult to meter since the material tends to cling to the walls of the conveyor and particularly at points where there are discontinuities in the conveyor wall or changes in direction. Adherence of the material to the walls of the conveyor not only reduces the area of the conveyor but also reduces the rate of flow of the material.

Accordingly one object of the invention resides in the provision of novel and improved apparatus for conveying bulk material to attain control flow and improved uniformity of the discharged product.

A further object is to provide a method for conveying bulk materials that is particularly applicable to bulk materials having inherent adhesive characteristics.

Another object resides in the provision of novel and improved apparatus that is readily adaptable for conveying a wide variety of bulk materials.

A further object is to provide apparatus for conveying bulk materials and having improved wall structures and cooperating means to prevent adherence of the bulk material.

A further object is to provide material conveying apparatus including means for imparting to the material substantially the flow characteristics of a liquid, whereby the passage of the body of bulk material may be freely guided and conveyed without variations arising from local adhesion to the conveyor walls.

A further object is to provide apparatus of the above nature particularly adapted to use in metering and filling devices wherein uniformity and accuracy of delivery are essential.

A still further object is to provide apparatus for conveying materials which is characterized by its simplicity, flexibility and adaptability to various types and directions of feeding services.

Other objects and advantages of the invention will become evident during the course of the subsequent description in connection with the accompanying typical drawing.

With prior apparatus for conveying goods and particularly in devices for filling containers with metered quantities of inherently adhesive bulk materials such as flour, cake-mixtures, fodder, certain kinds of cocoa and the like, frequent errors are encountered in securing the quantity or the weight of the material conveyed. These errors are largely due to the fact that parts of the bulk material adhere to the side walls or so-called "slide faces" of the conveying devices and to connecting surfaces between a metering device and the container or other device to receive the material. Attempts to ameliorate this difficulty have included recourse to shaking the slide faces or walls or to the application of silicone-containing or similar coatings to prevent adhesion. Experience has demonstrated, however, that these measures per se are not properly effective, particularly with highly adhesive bulk substances.

The present invention eliminates the above difficulty by introducing a radically different action, namely the intimate mixture of the bulk material with a gas such as air. Such a mixture has been found to possess substantially the flow characteristic of a liquid, and cause the material to flow readily and without adhesion over guiding walls or faces even if the latter are only slightly inclined from the horizonal. This quality obviously renders the present invention applicable to a variety of conveying and guiding means such as delivery chutes and the like, though an important application resides in the filling of hoppers. Accordingly this description will be directed to such a hopper as diagrammatically illustrated in the drawing. While the hopper is circular in section, it will be obvious that it may be made in any other desired and practical shape.

Referring to the drawing, the numeral 1 indicates an outer hopper wall formed in inverted conical or funnel shape. A slotted spacer gasket 2, preferably of resilient material such as rubber or the like, is disposed on and encircles the upper rim of the outer wall 1. An inner wall or screen 3 is crimped or otherwise secured at its upper rim over the gasket 2, while the lower rim may be secured directly around the bottom edge of the outer wall 1 as illustrated. The gasket 2 is of substantial vertical thickness and inwardly directed radial extent, so that a tapering space or chamber 6 is defined between the downwardly convergent outer and inner walls.

The inner screen or slide face 3 consists of a gas-permeable netting or fine mesh of metal, silk, plastic material or the like, the choice of material being governed by the type of service and nature of the particular bulk substance to be handled. In structures for use with heavy bulk materials the permeable wall 3 may be made as a composite of a stiffening shell perforated after the manner of a sieve and supporting the fine mesh on its inner surface. A plurality of pipe nozzles 4, secured to and leading through the outer wall 1 near the upper edge thereof, are adapted to conduct a gas under pressure into the inter-wall space 6. The gas, preferably air, may be derived either under steady or pulsating pressure from any suitable source, of which various types are well known and hence need not be further described herein. Baffle members 5, extending downwardly inside the double-walled hopper structure in spaced registry with the nozzle 4, serve to prevent direct local blast of the inrushing gas through the permeable wall 3, by diverting the gas laterally and distributing it throughout the cavity 6.

In operation, as the bulk material is deposited in the hopper for delivery through the lower end thereof, the gas under pressure in the space 6 forces its way in finely divided streams through the permeable screen or slide face 3 and enters the adjacent mass of bulk material moving along the surface, thus forming the previously mentioned free-flowing intimate mixture of gas and solid which readily traverses the slide face without adherence thereto. It will be evident that by the above action the mass of bulk material is in effect lubricated in its passage as gravity directs it along the guide wall. For various applications the gas pressure is preferably applied in pulsations of any desired frequency, in which case the pulsating pressure within the chamber or cavity 6 causes the slide screen 3 to vibrate due to its elasticity, thus further facilitating the free flow of the bulk material.

While the illustrated embodiment of the invention provides for the application of the gas throughout the entire inner surface of a typical filling hopper, it may be applied in selected areas or any other desired manner. For example, in the case of filling hoppers having relatively large discharge openings, the double-walled pneumatic construction may advantageously be confined to such parts whereon the bulk material normally impinges and slides. Similarly, a hopper can be provided composed of a number of individual segments each of which includes a gas permeable netting and the related pneumatic connections. It will further be evident that the invention is well adapted to conveying structures other than hoppers, for example to the walls and bottoms of delivery chutes and the like. Thus, while the invention has been set forth in typical preferred form it is not limited to the precise embodiment illustrated, as various modifications and adaptations may be made without departing from the scope of the appended claims.

What is claimed is:

1. A hopper of the class described, comprising in combination, an outer wall, a resilient sealing and spacing gasket of substantial cross sectional area secured on the upper rim of said outer wall and extending a substantial distance inwardly therefrom, an inner guiding wall consisting of elastic fine-mesh netting, said inner wall engaging the inner surface of said resilient spacing gasket and extending in engagement outwardly over the top thereof, the lower rim of said inner wall being secured to the lower rim of said outer wall, whereby a tapered downwardly convergent chamber is defined between said walls, and means to admit gas in pulsations of pressure to said chamber.

2. The combination claimed in claim 1 wherein said gas admitting means includes a plurality of nozzles directed into the enlarged upper portion of said tapered chamber.

3. The combination claimed in claim 1 wherein said gas admitting means includes a plurality of spaced nozzles secured in said outer wall and directed inwardly to the enlarged upper portion of said tapered chamber, and a plurality of deflecting baffles spaced inwardly from and in respective registry with said nozzles.

References Cited in the file of this patent

UNITED STATES PATENTS

| | | |
|---|---|---|
| 1,570,795 | Tainton | Jan. 26, 1926 |
| 1,759,983 | Houston | May 27, 1930 |
| 2,527,466 | Townsend | Oct. 24, 1950 |
| 2,665,035 | Schemm | Jan. 5, 1954 |
| 2,708,602 | Galle | May 17, 1955 |
| 2,828,163 | Aller | Mar. 25, 1958 |

FOREIGN PATENTS

| | | |
|---|---|---|
| 689,191 | France | May 26, 1930 |
| 734,696 | Germany | Mar. 25, 1943 |
| 709,265 | Great Britain | May 19, 1954 |
| 729,799 | Great Britain | May 11, 1955 |